US 6,726,224 B2

(12) United States Patent
Jurr et al.

(10) Patent No.: US 6,726,224 B2
(45) Date of Patent: Apr. 27, 2004

(54) PNEUMATIC SUSPENSION SYSTEM FOR A MOTOR VEHICLE

(75) Inventors: Reinhold Jurr, Munich (DE); Reimar Schoop, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 54 days.

(21) Appl. No.: 09/958,030

(22) PCT Filed: Jan. 17, 2001

(86) PCT No.: PCT/EP01/00443
§ 371 (c)(1),
(2), (4) Date: Oct. 3, 2001

(87) PCT Pub. No.: WO01/56820
PCT Pub. Date: Aug. 9, 2001

(65) Prior Publication Data
US 2002/0153688 A1 Oct. 24, 2002

(30) Foreign Application Priority Data
Feb. 4, 2000 (DE) .......................... 100 04 880

(51) Int. Cl.⁷ ............................................. B60G 17/052
(52) U.S. Cl. ................................ 280/5.514; 280/6.157; 280/124.16
(58) Field of Search ................... 280/5.514, 6.151, 280/6.152, 6.157, 6.158, 124.16

(56) References Cited

U.S. PATENT DOCUMENTS

| | | | |
|---|---|---|---|
| 1,207,436 A | * 12/1916 | Ohlsen | ............ 417/299 |
| 4,625,994 A | 12/1986 | Tanaka | |
| 5,159,554 A | 10/1992 | Buma | |
| 5,393,087 A | 2/1995 | Taniguchi | |
| 5,452,919 A | 9/1995 | Hoyle | |
| 5,467,595 A | * 11/1995 | Smith | ............ 60/410 |
| 6,189,903 B1 | * 2/2001 | Bloxham | ............ 280/124.16 |
| 6,354,617 B1 | * 3/2002 | Behmenburg et al. | ............ 280/124.157 |

FOREIGN PATENT DOCUMENTS

| | | |
|---|---|---|
| DE | 2942081 | 5/1981 |
| DE | 3919438 | 12/1990 |
| DE | 4235111 | 4/1994 |
| DE | 19640149 | 4/1998 |
| EP | 0224663 | 7/1998 |
| GB | 2331494 | 5/1999 |

OTHER PUBLICATIONS

Copy of the International Search Report, Jun. 2001.

* cited by examiner

*Primary Examiner*—Paul N. Dickson
*Assistant Examiner*—David R. Dunn
(74) *Attorney, Agent, or Firm*—Crowell & Moring LLP

(57) ABSTRACT

A pneumatic spring system is provided for a motor vehicle with a compressor unit, a storage unit, as well as on-off valves, via which the individual pneumatic springs of the individual wheels are supplied with compressed air. In the area between the compressor unit and the on-off valves, there is provided a vent line that empties out into the atmosphere and that can be locked or cleared by a locking valve. Provision is also made for measures with whose help the air mass flow, emerging via the cleared vent line during a certain time interval, can be limited with respect to an unlimited state in order to prevent any undesirable noise generation during the venting of the system. One measure connects in parallel to a separately lockable main vent line, a separately lockable high-pressure vent line whose clear through flow cross section is smaller than that of the main vent line. Alternatively, a choke element can be provided in the vent line. The through flow cross section of the vent line can be limited with the help of that choke element.

4 Claims, 3 Drawing Sheets

PNEUMATIC SUSPENSION SYSTEM FOR A MOTOR VEHICLE

BACKGROUND AND SUMMARY OF THE INVENTION

This invention relates to a pneumatic suspension system for a motor vehicle including a compressor unit, a storage unit, as well as on-off valves via which individual pneumatic springs of the individual vehicle wheels are supplied with compressed air. In the area between the compressor unit and the on-off valves, a vent line is provided that can be locked or that can be released. The vent line opens up into the atmosphere. As for the technical field, reference is merely made by way of example to German patent document DE 29 42 081 C2.

Pneumatic suspension systems are distinguished from all mechanically buffered wheel suspensions by greater flexibility or greater variability. In the case of two-axle pneumatic systems, for example, the height of the vehicle superstructure with respect to the ground and, thus, the ground clearance of the motor vehicle, can be altered. Usually, one employs so-called open pneumatic systems here where (in two-axle pneumatic systems), when the vehicle superstructure is lowered from a raised position, the air mass that is to be evacuated for this purpose from the pneumatic springs is evacuated by a so-called vent line and out into the atmosphere, that is to say, into the environment. If this lowering action is to take place within a relatively short time span, then the cross-section—more specifically, the clear through flow profile of the vent line that is usually provided in the vicinity of the compressor unit of the pneumatic system and that can be closed-off or cleared by means of a locking valve—must have a certain minimum size.

In this connection, reference is made expressly to the fact that the invention at hand is not confined to two-axle pneumatic systems, but can also be used equally for single-axle pneumatic systems. It might furthermore be mentioned that the static air pressure—that is located upstream from the still closed on-off valves and that thus is applied in the pneumatic springs—can be within the order of magnitude of 4 to 10 bar; the dynamic pressure values can be definitely higher. The total system pressure also is usually higher, that is to say, up to the level of the pressure in a storage unit.

Along with a compressor unit (with whose help the system pressure, required for charging the mentioned pneumatic springs, or the pertinent required air mass that will be supplied in the final analysis), there is also usually provided an already briefly mentioned storage unit. Placed in the storage unit for intermediate storage are air masses that are compressed by the compressor unit, since a reasonably dimensioned compressor would not be able to supply the required air mass for the desired lifting of the vehicle superstructure, within a practical amount of time. If the vehicle superstructure is then to be raised, one can draw the necessary air mass, which is subjected to adequate system pressure, from the preferably completely filled storage unit.

This explanation clearly shows that the pressure, prevailing in the filled storage unit, must be greater than the pressure usually applied in the pneumatic springs. This is because, otherwise, it would not be possible to fill those springs any further. By way of example, the pressure, prevailing in the filled storage unit, can be on the order of 15 bar. It is furthermore obvious that the compressor unit can be shut down after the complete filling of the storage unit, so long as no air mass is drawn from the storage unit. In this stage, it is desirable that one reduce the pressure applied in the pertinent line system, that is to say, in the line system between the compressor unit as well as the mentioned on-off valves, which, for instance, can be combined into a so-called valve block and on whose side—facing away from the compressor unit—the individual pneumatic springs are connected. In other words, one can aerate or vent this line system. A venting of this line system, that is to say, of the compressor unit, as well as the line segment between the compressor unit and the valve block or the on-off valves (naturally, without the storage unit that branches off from that line section and that can be closed off), is basically possible here via the previously mentioned venting line that is provided in the area between the compressor unit and the valve block.

But it was found that this aeration, venting or pressure release of the system (which initially is under the (higher) pressure of 15 bar, mentioned earlier by way of example) via this venting line is accompanied by an undesirable, practically no longer acceptable noise generation. In case of a desired lowering of the vehicle superstructure, starting with a pressure level of 4–10 bar, for instance, only part of the air mass contained in the system is evacuated in an abrupt manner via this venting line, whose pressure level is reduced compared to the higher pressure level of, for instance, 15 bar. Of course, a sound absorber or the like could be provided in the vent line. However, such an absorber represents a choke that works in an undesirable manner and that is always present, and, therefore, also in case the vehicle superstructure is lowered.

The object of the present invention is to point out a comparatively more favorable expedient in helping to solve the complex problem just described. The solution of this problem is characterized by measures with whose help one can limit the air mass flow that emerges via the cleared vent line during a certain time interval, as compared to an unlimited state. Advantageous embodiments and developments are covered in the subclaims and described herein.

According to the invention, the mass of the airflow that is conducted through the vent line can be limited. Specifically, when the pressure in the system is to be reduced between the compressor unit and the valve block or the on-off valves, that is to say, after the storage unit has been completely filled, the mass of air flow is limited. So that this, previously described, relatively high pressure will not be reduced abruptly (thus generating noises) via the vent line, it is possible for these cases to limit the magnitude of the air mass that is moved through the vent line within a certain time interval, that is to say, to limit the air mass flow. On the other hand, if the vehicle superstructure is lowered and if, accordingly, a part of the air mass, located in the pneumatic springs, is also evacuated via this vent line into the atmosphere, there should not be any such restriction or limitation, that is to say, in that case, the full flow cross section of the vent line should be available to facilitate the relatively fast lowering of the vehicle superstructure.

Basically, there are various possibilities of an optional restriction or a release, that is to say, lifting of this restriction or limitation of the air mass flow that can be conducted through the vent line within a certain time span. By way of example, using a switchable branch, one can optionally connect a sound absorber into the vent line, although this solution requires a relatively large amount of structural space.

Comparatively more favorable measures are listed in the subclaims and will be described in greater detail in the following.

DETAILED DESCRIPTION OF THE DRAWINGS

Figure 1:
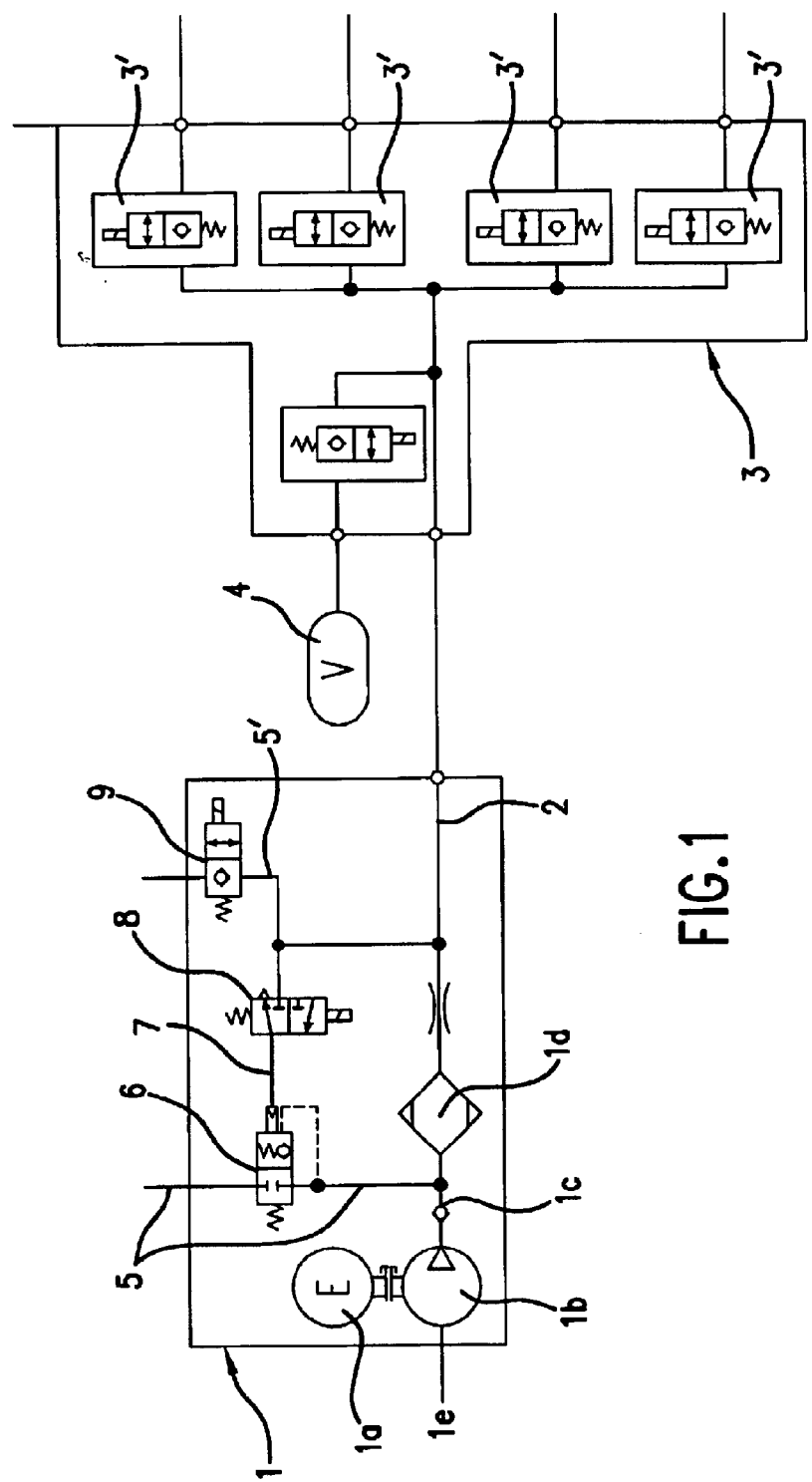
FIGS. 1–3 show the circuit diagrams of preferred exemplary embodiments of the present invention. The same elements are labeled with the same reference numbers in all figures.

Reference 1 is used to label the compressor unit of a pneumatic system of a motor vehicle that consists of an electric motor 1a of a motor vehicle, a compressor 1b, driven by the electric motor 1a, as well as a dryer 1d, arranged in the compressor's pressure line 1c. Air, suctioned in via a suction line 1e, is condensed in compressor 1b and is supplied —via pressure line 1c, as well as an adjoining line segment 2 —to a valve block 3 (not illustrated in any further detail). From this valve block 3, in which are combined individual on-off valves that are associated with the individual pneumatic springs and which are labeled 3', this condensed air can be moved in a controllable manner into a storage unit 4 or directly into the pneumatic springs (not shown). The pneumatic springs are associated with the wheels of the motor vehicle. As was explained earlier, valve block 3 or on-off valves 3'—in case of a desired further filling of these pneumatic springs, in particular, for the purpose of lifting the vehicle superstructure—are switched such that, especially, the air mass located in the filled storage unit 4 will be supplied to the pneumatic springs.

In case of a desired partial evacuation of the pneumatic springs (in particular, to lower the vehicle superstructure), the air, however, is not returned into the storage unit 4. Instead, the air is evacuated into the environment via a vent line 5. This vent line 5 is located in the area of the compressor unit 1, that is to say, vent line 5 branches off from pressure line 1c, but it can just as well branch off from line segment 2. Naturally, a locking valve 6 is provided or required in the vent line 5 to ensure that air can get out of the system into the environment only when this is actually desired.

As indicated in the above explanations, this vent line 5 is used to evacuate air out of the system into the environment not only when a part of the air located in the pneumatic springs is to be taken out but also when, after the filling of storage unit 4 with the valve block 3 being closed, the line segment 2 as well as compressor unit 1 are to be aerated.

In all exemplary embodiments, the locking valve 6, provided in vent line 5, is made as a pressure-controlled valve, that is to say, locking valve 6 can be opened by the system pressure prevailing between the compressor unit 1 and the valve block 3. For this purpose, a pilot control line 7 branches off from the line segment 2. A control valve 8 is provided in the pilot control line 7, which is preferably an electromagnetic valve, and is placed against the control side of the locking valve 6. Accordingly, with the control valve 8 being opened, the locking valve 6 is basically opened or kept open until such time when the pressure in line segment 2 and in compressor unit 1 has dropped to the so-called threshold value of the locking valve 6, for example, close to the ambient pressure.

In the exemplary embodiment according to FIG. 1, a high-pressure vent line 5' is connected in parallel to the main vent line 5 which is lockable by means of the locking valve 6. The high-pressure vent line 5' can also be locked separately by means of a so-called vent valve 9. The clear through flow cross section of that vent line 5' is less than that of the main vent line 5. Here, this vent line 5' branches off from the pilot control line 7, upstream from the control valve 8, but it can just as well also branch off directly from line segment 2. The just mentioned clear through flow cross section of the two vent lines 5, 5' in the process is determined in each case by a narrowest cross section, that is to say, by a so-called "narrow" in these vent lines. Most of the time, the clear through-flow cross section of the particular valve, provided in vent line 5 or 5' (locking valve 6 or vent valve 9), defines this clear through-flow cross section. If a part of the air mass is to be taken out of the pneumatic springs (not shown), then this part, as usual, with valve box 3 suitably switched, is conducted via line segment 2 into vent line 5 as well as into pilot control line 7 so that, with vent valve 9 being closed, the locking valve 6 is opened as a result of the opening of control valve 8 and this air mas can then be released into the environment via the vent line 5. Because relatively fast air evacuation is desired, the vent line 5 or the open locking valve 6 has an accordingly large clear through-flow cross section.

On the other hand, with the valve block 3 being locked (closed), after the filling of storage unit 4, if line segment 2 as well as compressor unit 1 are to be aerated, then, as described earlier, the control valve 8 remains closed. On the other hand, vent valve 9 is then opened so that the air mass, located in the mentioned line segment 2, and over pressurized when compared to the atmosphere, can then get into the environment via the cleared high-pressure vent line 5'. The clear through-flow cross section of this vent line 5'—that is preferably defined by the clear cross section of the opened vent valve is made so small here that this pressure reduction, starting from a high pressure level (that is to say, the previously mentioned figure of 15 bar, given by way of example) will be delayed and that, therefore, it will not be accompanied by any undesirable noise generation.

The air mass that is to be evacuated in case of a venting of line segment 2 as well as compressor unit 1 is mostly considerably smaller than the air mass that must be evacuated into the environment out of the pneumatic springs in case the vehicle superstructure is lowered. The clear through flow cross section of the high-pressure vent line 5' is considerably smaller than the pressure in the main vent line 5; nevertheless, line segment 2 is therefore vented via this, so to speak choked high-pressure vent line 5' within a justifiably short span of time. As for the rest, after expiration of a small time span and after the absolute pressure peak values have already been reduced, the vent valve 9 can be closed and the control valve 8 can be opened so that the continued residual venting will take place via the main vent line 5. There is therefore no reason to fear any annoying noise generation on account of the fact that the pressure reduction has already taken place.

Figure 2:
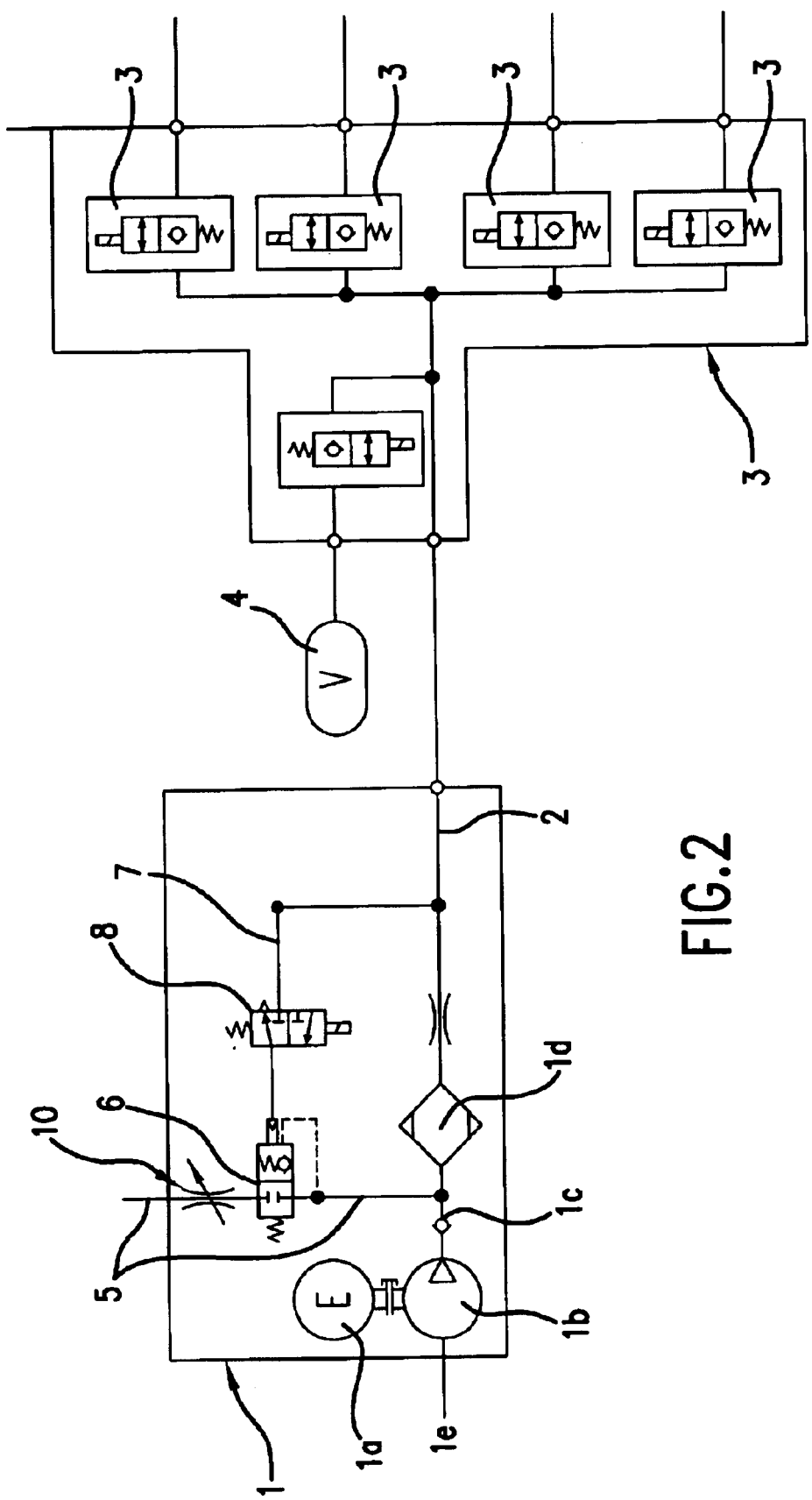

In the exemplary embodiment according to FIG. 2, a choke element 10 is provided in the sole vent line 5. With the help of that choke element, the clear through flow cross section of vent line 5—that has been cleared by opening the locking valve 6—can be limited. Basically, this choke element 10 can be suitably adjusted by an adjusting device (not shown), that is to say, in case of a desired lowering of the vehicle superstructure and an attendant air mass evacuation out of the pneumatic springs, via vent line 5, the free through-flow cross section of that vent line can be maximized. In other words, the choke effect of the variable choke element 10 is minimized. On the other hand, in case of a desired venting of the line segment 2, as well as the compressor unit 1 the valve block 3 being locked, the choke effect of the choke element 10 is maximized in order to minimize the free through flow cross section of the vent line 5. Thus, this measure likewise makes it possible to prevent the undesirable noise generation, in the last-mentioned operating state, that was initially described.

By way of an advantageous development, choke unit 10 can be designed so that it will automatically and variably limit the free through-flow cross section of vent line 5 as a function of the pressure level prevailing upstream from the choke element 10. The adjusting device, mentioned in the preceding paragraph, will then not be needed. With the application of high pressure in case of a desired venting of the system (on the order of magnitude of 15 bar, as mentioned by way of example earlier), a free through-flow cross section of the vent line 5 is thus limited by itself, that is to say, automatically, whereas, at a lower pressure (for example, on the order of magnitude 9 bar), the maximum possible passage cross section is released because the undesirable noise generation does not occur then anyway.

No design embodiments are given in FIG. 2 for the two described variants of the variable choke element 10 since such variable choke elements are known or can be shaped in a relatively simple fashion. A variable choke element that is adjusted automatically as desired, for example, can have a slide that more or less restricts the free through-flow cross section of the vent line 5 and that, on the one hand, is spring-loaded and, on the other hand, has a control surface that is impacted by pressure upstream from the choke element 10. If there are high pressure values upstream from the choke element 10, then this slide is moved by the pressure, acting upon the control surface, against the force of the spring element and into a position that relatively greatly limits the free through-flow cross section. Whereas, on the other hand, in case of low pressure values upstream from the choke element 10, this slide is moved by the force of the spring element into a position that practically does not have any choking effect, that is to say, that more or less completely releases the through-flow cross section of the vent line 5.

Figure 3:
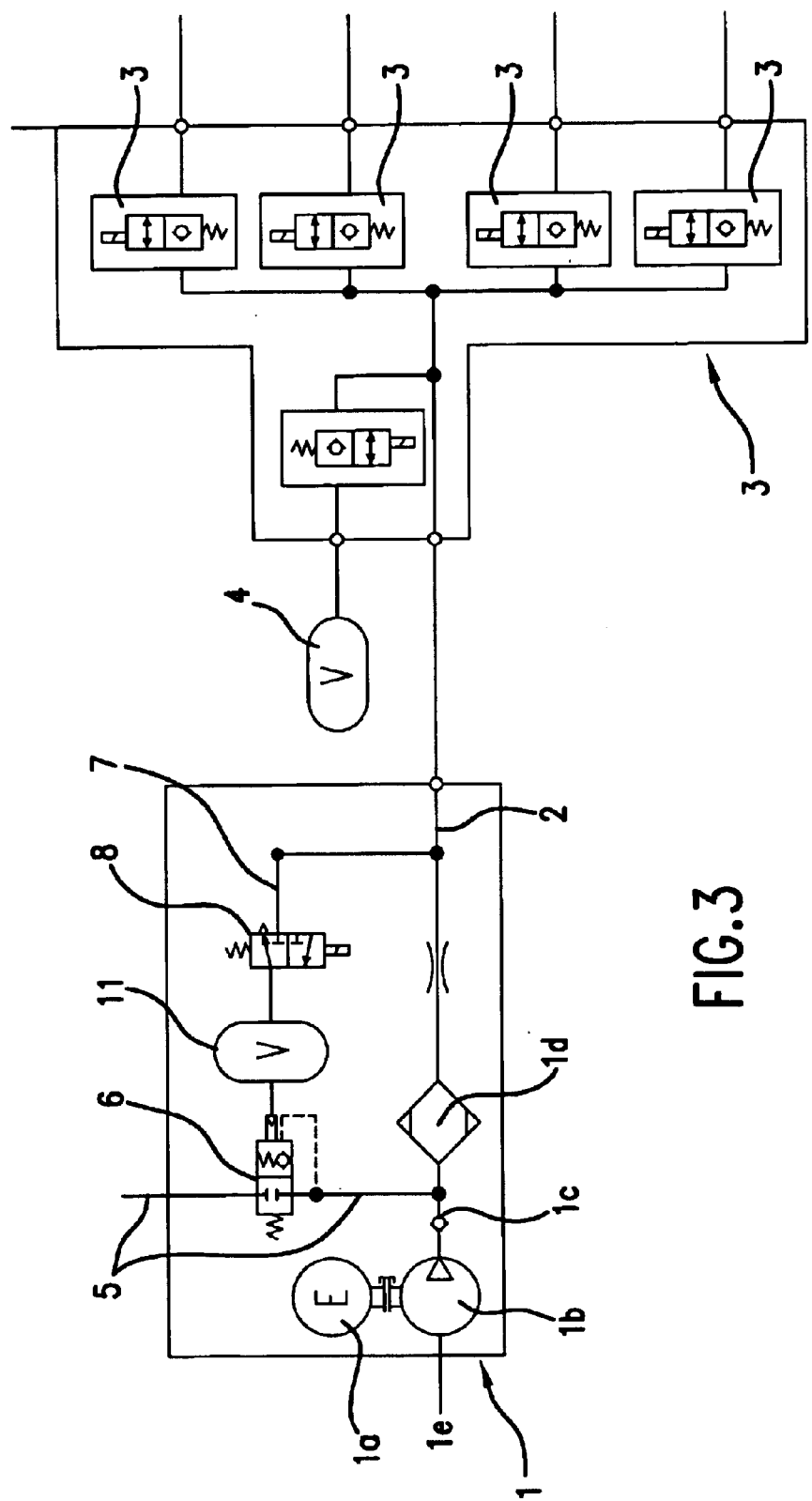

Only a single vent line 5 is also shown in the exemplary embodiment according to FIG. 3. In contrast to the previously mentioned exemplary embodiments, it is essential for the operation of this exemplary embodiment that the locking valve 6, provided in the vent line 5, be opened by the system pressure prevailing in the area of the compressor unit and applied via the previously mentioned pilot control line 7. A so-called pressure release volume 11 is provided upstream from the locking valve 6 and downstream from the control valve 8 in or on the pilot control line 5. One embodiment is illustrated specifically here; in this embodiment, the pressure release volume 11 is located directly in the pilot control line 7. In an alternate embodiment, this pressure release volume 11 can branch off from the pilot control line 7 via a tap line (not shown).

This exemplary embodiment according to FIG. 3 works in the following manner. It was mentioned earlier that, in case of a venting of the line segment 2, as well as the compressor unit 1, the air mass that is to be evacuated will be considerably less than the air mass that must be evacuated out of the pneumatic springs into the environment in case the vehicle superstructure is lowered. If, in other words, there is a venting of the line segment 2, then as mentioned earlier, starting with a relatively high pressure level, for example, on the order of magnitude of 15 bar, after the opening of control valve 8 this air mass, which is under high pressure, expands into the pressure release volume 11 that is considerably larger when compared to the volume of the pilot control line 7. Before the pressure-controlled locking valve 6 can thus be opened at all, via pressure release volume 11 there already takes place such a pressure reduction (for example, down to the level of 4–10 bar which is customary when the vehicle superstructure is lowered) that, after the opening of the locking valve 6, there can no longer be any disturbing noise generation that can be prevented with the help of the invention at hand. Here again, on account of the pressure reduction in the pressure release volume, the air mass flow through the cleared vent line 5, following the opening of the locking valve 6, is limited.

This pressure release volume 11 exerts practically no influence in case of a desired lowering of the vehicle superstructure. This is because the air mass, which then is to be evacuated via vent line 5, is so great that its minor partial pressure release in the pressure release volume 11 can be neglected. This exemplary embodiment, according to FIG. 3, is thus distinguished by a particularly simple structure. It must also be pointed out that, naturally, numerous details can certainly be designed so as to deviate from the explained exemplary embodiments, without going beyond the scope and content of the claims.

What is claimed is:

1. A pneumatic system for a motor vehicle, comprising:
   a compressor unit;
   a storage unit;
   on-off valves for supplying compressed air from said compressor unit to individual pneumatic springs of individual vehicle wheels;
   a main vent line provided between the compressor unit and the on-off valves, said vent line opening up into the atmosphere;
   a locking valve operatively arranged to close the vent line; and
   a separately lockable high-pressure vent line connected in parallel to the vent line, wherein a clear through-flow cross section of the separately lockable high-pressure vent line is smaller than a clear through-flow cross section of the main vent line,
   wherein an air mass flow emerging into the atmosphere via the vent line when opened is limited with respect to its unlimited state during a certain time interval.

2. The pneumatic system according to claim 1, further comprising a choke element operatively arranged in the vent line, said choke element limiting the free through-flow cross section of the vent line.

3. The pneumatic system according to claim 2, wherein said choke element automatically and variably limits the free through-flow cross section of the vent line as a function of a pressure level prevailing upstream of the choke element.

4. The pneumatic system according to claim 1, wherein the locking valve operatively arranged in the vent line is opened via a system pressure prevailing between the compressor unit and the on-off valves, said system pressure being applied via a pilot control line; and wherein a pressure release volume is provided between the locking valve and a control valve operatively arranged in or on the pilot control line.

* * * * *